March 8, 1932.  F. C. B. PAGE  1,848,194
CLUTCH DRIVEN POWER PRESS
Filed July 30, 1930  2 Sheets-Sheet 1
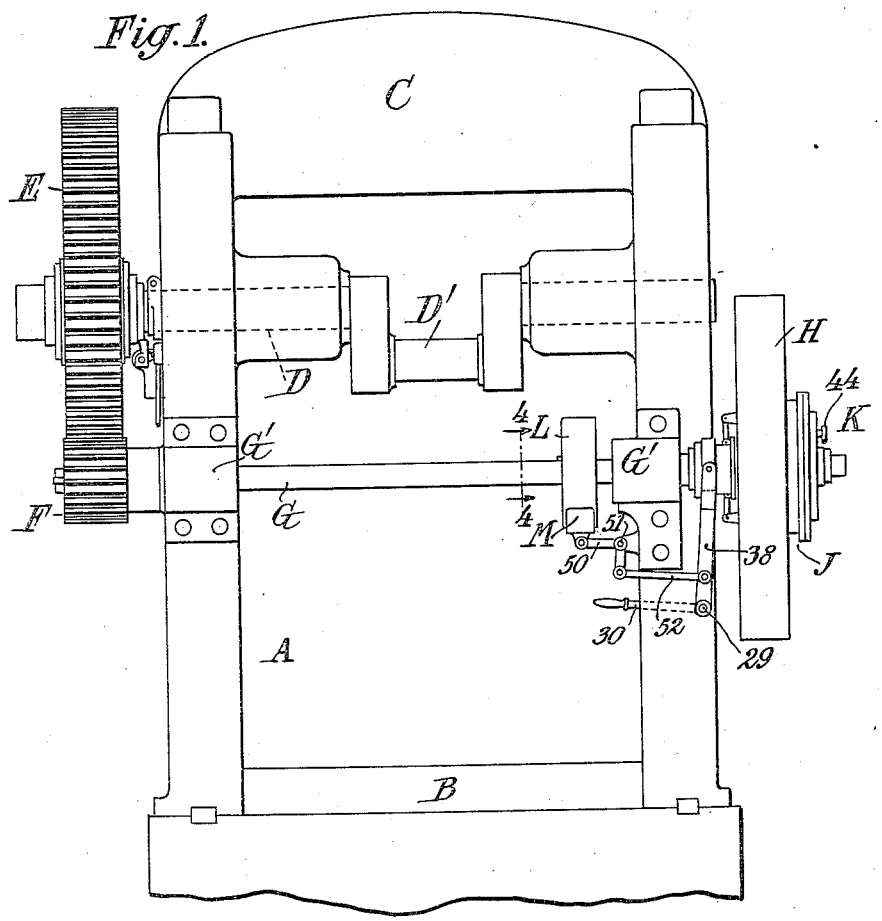
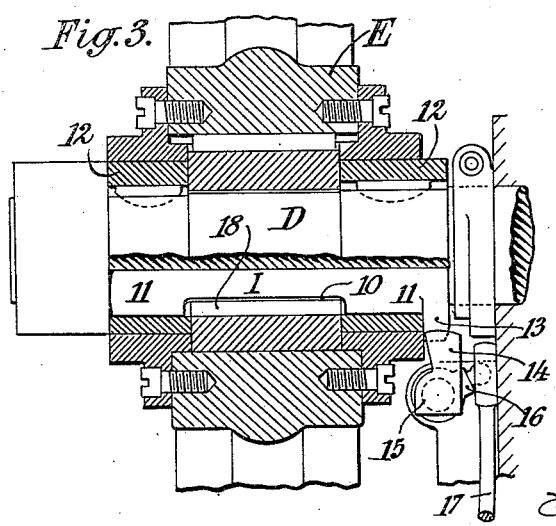
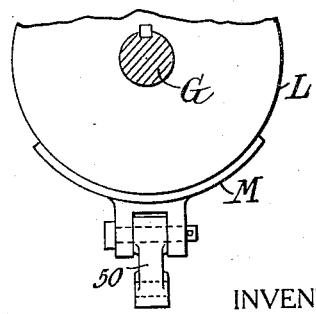
INVENTOR
Frank C. B. Page,
By Attorneys,
Chaser, Myers & Manly, March 8, 1932. F. C. B. PAGE 1,848,194
CLUTCH DRIVEN POWER PRESS
Filed July 30, 1930 2 Sheets-Sheet 2
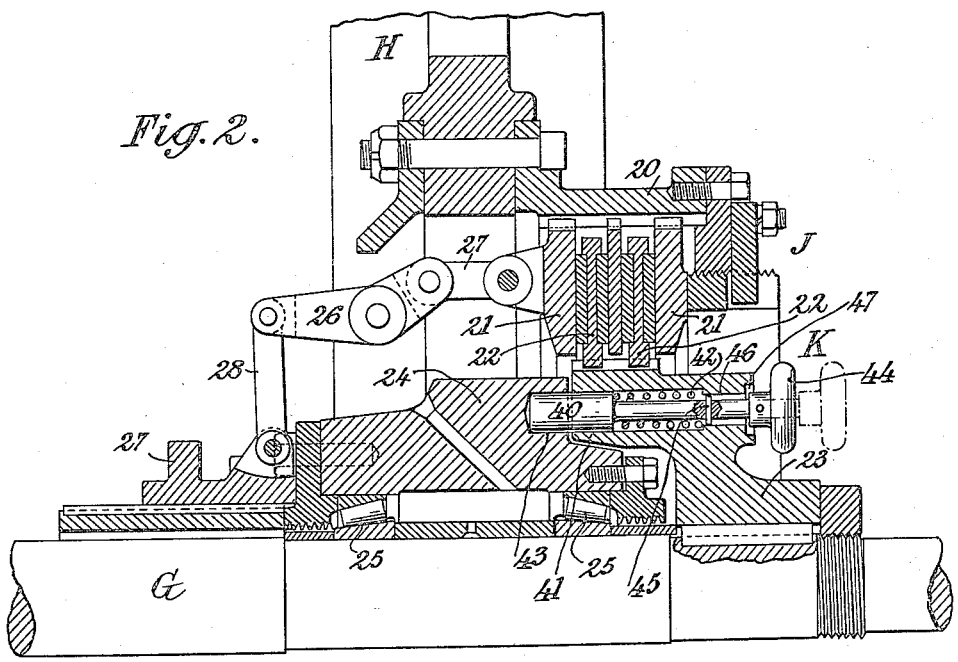
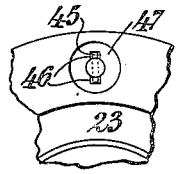
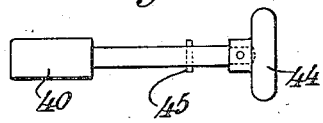
INVENTOR:
Frank C. B. Page,
By Attorneys,
Fraser, Myers & Manley Patented Mar. 8, 1932

1,848,194

UNITED STATES PATENT OFFICE

FRANK C. B. PAGE, OF BROOKLYN, NEW YORK, ASSIGNOR TO E. W. BLISS COMPANY, OF BROOKLYN, NEW YORK, A CORPORATION OF DELAWARE

CLUTCH-DRIVEN POWER PRESS

Application filed July 30, 1930. Serial No. 471,847.

This invention relates to power presses such as are used for pressing, stamping, drawing and other metal working or analogous operations.

It is common to construct such presses with a crank shaft for driving the reciprocating slide or platen which carries the punches or other tools for operating reciprocally with dies or other tools carried by a fixed bed beneath. It is usually desirable to turn this crank shaft one revolution at a time, stopping it with the crank uppermost, and for this it is customary to apply a clutch, which, when engaged, turns the crank shaft one revolution, and which then disengages itself and a suitable brake brings the shaft to rest at the upstroke, unless the clutch releasing means is held out of operation by the operator continuing to hold the starting treadle or other controlling means, in which case the shaft will turn for two or more revolutions and will not be stopped until such starting lever is released. Such one-revolution clutches are either positive clutches or friction clutches. The typical form most used for the positive clutch is a rolling key carried by the crank shaft and oscillatable to engage or free itself from a socket in the hub of the driving part, which may be a pulley or gear wheel. When a friction clutch is used it is applied to an initial or power shaft, or an intermediate jack shaft, through which the power is transmitted by means of gearing to the crank shaft, and the clutch operating means is operated from a starting treadle or other lever in timed relation with the crank shaft so as to disconnect the driving means at the end of any revolution of the crank shaft.

A key clutch or its equivalent is the means most commonly used, but has the disadvantage that in initially setting or adjusting the dies, when it is desired to turn the crank shaft little by little this can only be done by hand, and for somewhat heavy presses this becomes a burdensome performance. It is an advantage of the friction clutch driven press that the driving clutch may be used for turning the shaft little by little when setting the press or adjusting the dies; but this involves the disadvantage that the entire transmission during ordinary running occurs through the friction clutch, with consequent wear upon its frictional surfaces.

The object of the present invention is to provide a press having the advantages of both the positive acting or pin type of clutch and the friction type of clutch without incurring the disadvantages of either. To this end the press is provided with any usual positive clutch for engaging the crank shaft with its driving wheel; and with a friction clutch through which the drive is communicated to such driving wheel; and with means for positively locking the friction clutch so that in ordinary running it is kept out of use and is free from wear. By means of this novel construction the press is ordinarily operated as a positive-clutch or key-clutch press, but when it is desired to adjust the dies the operator has only to unlock the members of the friction clutch while keeping the key clutch engaged, and then by adjusting the frictional engagement of the friction clutch members so that the clutch may slip to any desired degree, he may impart a power drive to the crank shaft whereby it may be turned little by little, as may be required for the die adjustments. The invention also provides a friction brake operated reciprocally with the friction clutch so that during such adjusting operating the friction brake automatically engages and holds the crank shaft from turning whenever the friction clutch is disengaged, and vice versa.

The accompanying drawings show one suitable embodiment of the invention as applied to an upright press.

Figure 1 is a rear view of the press showing the power transmission means.

Fig. 2 is a section in a plane coincident with the axis of the power shaft.

Fig. 3 is a section through the crank shaft and the hub of its driving wheel, showing the usual pin clutch.

Fig. 4 is a section on the line 4—4 of Fig. 1 showing a fragment of the brake which coacts with the friction clutch.

Fig. 5 is a view of the friction clutch bolt removed.

Fig. 6 shows a part of the friction clutch.

Referring to Fig. 1, A represents the frame of the press, which, in the present instance, is an upright frame having vertical side members resting on a base B and with a crown C at the top. This showing is merely typical, as the press frame may be modified according to any of the constructions used for power presses, which are varied according to the particular use to which the press is to be put. D is the crank shaft which is shown as having bearings as usual in the upright side frames of the press, and driven by a driving wheel E, which, in this instance, is a gear driven by a pinion F on a drive shaft G which is located at the rear of the press and extends across, having on its end opposite the pinion a driving pulley H, within which is the friction clutch by which it is clutched to the shaft or permitted to turn freely, as the case may be. The shaft G is shown as turning in bearings G', G' formed on or fastened to the upright side members of the frame at its rear. The usual vertical, reciprocating tool-carrying slide or platen is not shown, nor is the pitman or other connection by which it is driven from the crank D' illustrated, these parts being so well known in the art as to require no illustration.

The shaft D is driven from its wheel E by any suitable type of positive action clutch, of which the Bliss type of rolling key clutch is typical, this being the construction illustrated in Fig. 3. This type of key clutch is so well understood that any detailed explanation is unnecessary; but reference may be made to the patent of R. W. Strout, No. 1,501,422, dated July 15, 1924, for a showing of a suitable, and for most uses the preferable, form of such clutch. Suffice it here to say that the rolling key I which is cut away at 10, has its undivided end portions 11 mounted to turn in bearings formed half in the shaft and half in collars 12 keyed and fastened to the shaft; and has an arm 13 at its projecting end which is engaged by a stop arm 14 on a rock shaft 15 having an arm 16 operated by a rod 17 which is carried down to the starting treadle, all in the usual and well known manner. The hub of the wheel E has one or more notches 18 arranged to be entered by the rolling pin I when the latter is turned, in order thereby to lock the wheel and shaft together during the working revolution of the shaft, at the end of which the key arm 13 strikes the stop arm 14 and the key is turned so as to free its cut out portion from the hub of the wheel so that the latter is disconnected and revolves freely around the shaft. This release is usually arranged to occur when the crank D' is at top stroke.

According to the present invention the drive from the pulley or fly-wheel H to the shaft G is through a friction clutch J, which, in the present instance, is conveniently enclosed within the pulley H. It will be understood that the pulley H may be replaced by a gear wheel or any other member from which power is transmitted through the clutch J to the shaft. The friction clutch shown is a usual type of disk clutch having a drum portion 20, within which are disks 21 splined to it, and alternating with these are disks 22 splined to the hub 23 which is keyed on the shaft G. The fly-wheel H has a hub 24 which is mounted to turn freely on the shaft G, being preferably provided with roller or cone bearings 25, 25. The hub 24 carries the usual toggle levers 26 for imparting through toggle links 27 the movement for forcing the disks 21, 22 into frictional driving engagement. The clutching levers 26 are operated, as usual, from a sliding sleeve 27 through links 28, the sleeve 27 being engaged by a fork lever 38 which may be hung in any convenient way, it being shown in Fig. 1 as mounted on a cross shaft 29 extending transversely through the upright frame of the press and carrying on its opposite end a lever arm 30 which may be a hand lever or may be connected to a treadle for foot operation, as desired. Thus through the operation of the levers 30, 38, the friction clutch may be engaged or disengaged at will.

The clutch J has a locking means K whereby its driving and driven members may be bolted or locked together, this being the condition in the ordinary operation of the press. This locking means may conveniently be constructed as an ordinary spring-actuated bolt 40, housed in a chamber 41 in the hub 23, pressed outwardly by a spring 42 into normal engagement with a recess 43 in the hub 24, and having a knob or handle 44 on the exterior by which to operate it. The bolt, which is shown separately in Fig. 5, has fixed to its stem a cross pin 45 which normally slides freely in grooves 46 along opposite sides, so that when the bolt is withdrawn it may be turned to bring this pin out of the grooves and into engagement with a face or shoulder 47 whereby the bolt will be held in its disengaged position against the stress of the spring 42. Any other way of holding the bolt disengaged may be substituted.

A friction brake is provided in connection with the shaft G. A convenient construction is that shown wherein shaft G has fixed on it a brake hub L engaged by a brake shoe M. This brake shoe may be operated by an elbow lever 50 turning on pivot 51 in a suitable bearing block and having an arm which is connected in any suitable way to the operating lever 30, so that when the clutch J is engaged, the brake M will be disengaged, and vice versa. A convenient connection is by a link 52 to the lever arm 38, as shown.

The operation will now be apparent. In ordinary running the clutch J has its driving and driven members locked fast by the bolt K; the brake M is retracted so that the shaft G is freely turned by the pulley H, which is, in effect, fast with the shaft; accordingly, the gear wheel E is constantly driven so long as power is applied, and the crank shaft D is turned only when the key clutch is engaged in the well understood manner. But in initially setting the dies, or whenever it is necessary to make any adjustment, or under any conditions when it is desired to turn the crank shaft under power a little at a time, the operator, while the press is at rest, moves the lever 30 to apply the brake M, thus releasing the clutch J; he then withdraws the bolt K and fastens it back as described; the key clutch being applied to lock the wheel E and shaft D together, the operator may then, after applying power to turn the pulley H, operate the clutch and brake through the lever 30 in such manner as to apply the friction clutch very gently, so as while slipping to turn the shaft G and the crank shaft slowly, so that he is able to stop the crank shaft in any desired position; upon so stopping it the brake M is automatically applied and the crank shaft is thus held in such position. In this manner the operator may, by suitably slipping the friction clutch, impart any desired driving power to the crank shaft and may turn it at any desired speed or stop it at any instant as the needs of adjustment may dictate.

It will be understood that the invention is applicable to a great variety of constructions of power presses having varying types of positively-acting clutches and any desired form of friction clutch, and that the various operative parts may be modified as may be required for any particular use, all according to well known practices in the art of power press building. The particular construction of press illustrated and described is to be taken as a typical example of the press embodying the present invention. While I have referred to the shaft D as a crank shaft, it will, of course, be understood that it may be any other kind of shaft through which the operated tools or working parts of the die members or other means of acting upon the work is driven, my invention not being limited to a crank shaft, although this is the construction most commonly used.

This invention is to be distinguished from clutch-driven speed-change gearing wherein a positive clutch connects either the high-speed or low-speed gear and a friction clutch is interposed between such gears and the source of power, being automatically operated by the clutch shift lever so that the gear shift is first connected while the parts are under no-load and by a continuation of the same control movement the friction clutch is engaged to gradually throw on the load and bring the drive to speed. Such apparatus are applied to change-speed drives for lathes and are not applicable to power presses which have a normally revolving power-driven wheel positively clutched at intervals to the press-operating parts for turning these parts through a single revolution or other prescribed cycle of work. It is to the latter type of machine alone that the present invention applies.

I claim as my invention:

1. A press comprising an operating shaft, a wheel for driving it, a positively-acting clutch interposed between said shaft and wheel through which the shaft is normally driven, and an independently-operable, controllable friction-clutch interposed between the source of power and said wheel whereby a slip drive variable at will may be communicated through said friction-clutch and positive-clutch while the latter is engaged, to turn said shaft.

2. In a press according to claim 1, positive locking means for uniting the driving and driven members of said friction clutch whereby in ordinary operation the friction clutch members are relieved of wear.

3. A press according to claim 1, having a brake connected to be operated reciprocally with the friction-clutch so as to hold the driven parts when the friction-clutch is released.

4. A press according to claim 1, having a brake connected to be operated reciprocally with the friction-clutch so as to hold the driven parts when the friction-clutch is released, with a common operating means for said friction-clutch and brake whereby when the friction-clutch is released the brake is applied, and vice versa.

5. In a press of the type comprising an operating shaft, a revolving wheel continuously driven from a source of power, and a positively acting clutch interposed between said shaft and wheel, whereby to intermittently operate the shaft when said clutch is applied; the combination therewith of a friction clutch interposed between the source of power and said wheel, and means for operating said friction clutch independently of the means for operating the positively-acting clutch, said friction clutch operating means being variable at will to communicate a variable slip drive through the friction clutch to said wheel, whereby when the positively-acting clutch is engaged the shaft may be turned at reduced speed and started or stopped under manual control.

6. A press according to claim 5, having manually operated locking means for uniting the driving and driven members of the friction clutch whereby to incapacitate said clutch from operation during the ordinary working of the press.

In witness whereof, I have hereunto signed my name.

FRANK C. B. PAGE.